United States Patent [19]

Moss

[11] 4,455,472

[45] Jun. 19, 1984

[54] BED WARMER

[76] Inventor: Arlon R. Moss, 2101 Laverne Dr., Huntsville, Ala. 35810

[21] Appl. No.: 224,165

[22] Filed: Jan. 12, 1981

[51] Int. Cl.³ ............................................... H05B 3/54
[52] U.S. Cl. ...................................... 219/217; 5/284; 5/421; 219/364; 219/359; 219/502
[58] Field of Search ............... 219/364, 342, 217, 359, 219/366, 367, 502; 5/284, 421

[56] References Cited

U.S. PATENT DOCUMENTS

| 1,570,162 | 1/1926 | McKeehan et al. | 219/342 X |
| 2,452,234 | 10/1948 | Gerdes | 219/342 X |
| 2,565,390 | 8/1951 | Mitnowsky | 219/342 |
| 3,352,490 | 11/1967 | Dalzell et al. | 219/502 X |
| 3,882,363 | 5/1975 | Misencik | 219/502 X |

FOREIGN PATENT DOCUMENTS

| 514059 | 2/1955 | Italy | 219/217 |
| 68720 | 1/1945 | Norway | 219/217 |

Primary Examiner—Roy N. Envall, Jr.
Attorney, Agent, or Firm—C. A. Phillips

[57] ABSTRACT

A bed heater with two spaced, perforated, non-metallic plates between which there is arranged spaced loops of an insulated cover-type resistance heating fuse wire. At least some side area between the plates is open allowing lateral movement of air to prevent overheating. Power is supplied through a parallel SCR and diode circuit controlled by an R-C circuit including a temperature responsive resistor and a light responsive resistor.

1 Claim, 3 Drawing Figures

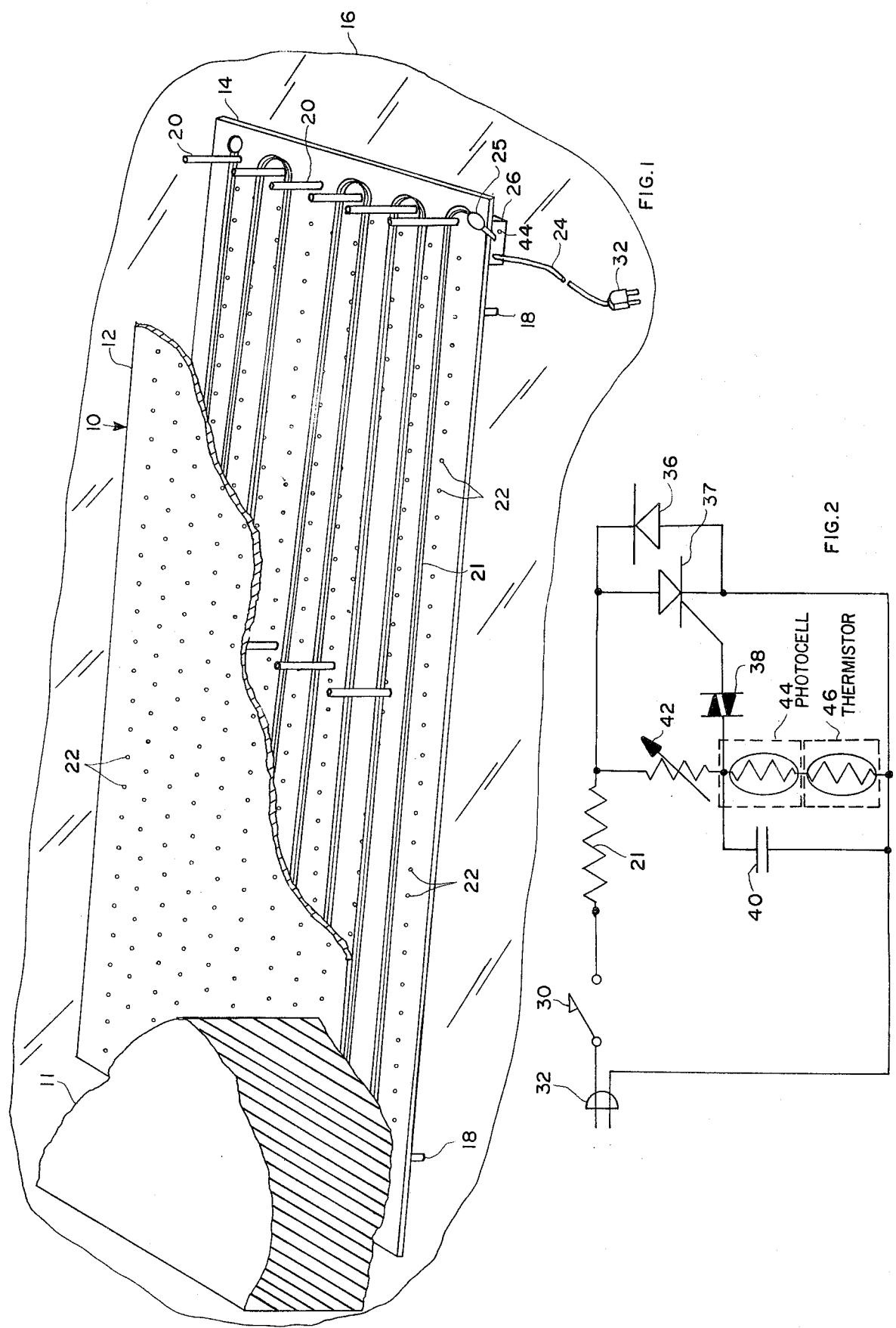

BED WARMER

TECHNICAL FIELD

This invention relates to heating devices, and particularly to a heater for heating a bed or other upholstered piece of furniture.

BACKGROUND ART

The standard means of providing auxiliary heat to a bed is an electrically powered blanket. To a lesser degree, where only localized heat is desired, electrically powered heat pads are used.

Electrical blankets are employed over one's person and provide a warming effect by virtue of one's proximity to the blanket. Typically, there is only a sheet separating one from the blanket. It is, of course, recognized that as heat rises, this is not an optimum relationship, but electrical blankets are not constructed of sufficient durability to provide adequate assurance of their safety if used as an underlay. In any event, as one is instructed to use them, as a cover, one suffers the disadvantage that a principal amount of the heat energy they release rises and is not available for heating one's body. Second, the blankets, as electrical devices, are relatively fragile and typically do not enjoy a long life. Finally, there have been many instances where the blankets have malfunctioned in use and have overheated very substantially. This, in turn, has produced serious danger to users.

The problems recited are particularly unfortunate at this time inasmuch as, unquestionably, electrical blankets can provide personal heat at a much reduced cost over that of a conventional space heating system.

It is the object of this invention to provide a bed heating system which is particularly comfortable to provide bed heating in a room with reduced room temperatures, e.g., 60° F. to 65° F., and to accomplish this in a much safer manner than accomplished by an electrically powered blanket.

DISCLOSURE OF THE INVENTION

In accordance with this invention, a bed heater is constructed in the configuration of a two-tiered table wherein a heating type element is arranged between the upper and lower leaves of the table in the form of spaced loops. The leaves of the table are perforated, and the bottom leaf is supported on legs a few inches above a floor underneath the bed. The area of the heater is 1.5 to 3 square feet, and the heat distribution effected by the heating element is in the range of from 40 to 100 watts per square foot of area.

BRIEF DESCRIPTION OF THE DRAWINGS

FIG. 1 is a pictorial view illustrating an embodiment of the invention, with the top portion cut away.

FIG. 2 is an electrical schematic diagram of a power input control as contemplated by this invention.

DETAILED DESCRIPTION OF THE DRAWINGS

Figure 3:
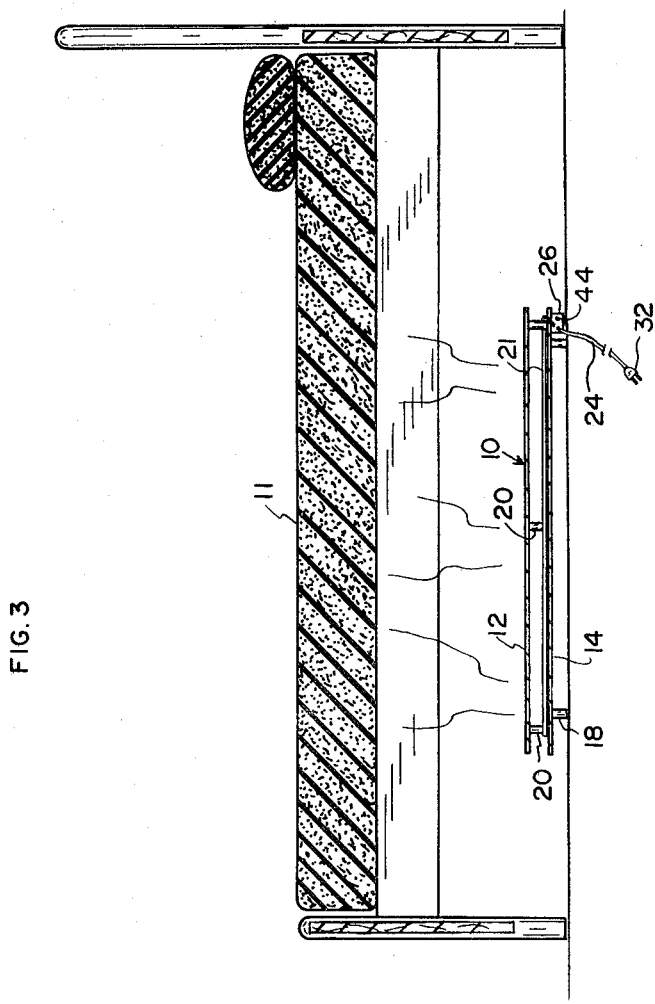
FIG. 3 is a cross-section view of an embodiment of the invention as it is placed under a bed.

Referring to FIG. 1, bed warmer or heater 10 is particularly adapted to be employed with, and is placed under, bed 11. The heater is constructed utilizing two spaced sheets 12 and 14 of perforated material, such as Masonite (Registered TM) Pegboard, a perforated board made of wood fibers. Lower sheet 14 is supported 2 to 3 inches above floor 16 by legs 18 positioned at each corner. A plurality of vertical pegs 20 are supported in holes of the Pegboard, and a length of fuse type resistance heating wire 21 is looped around the pegs (either side-to-side or end-to-end, as shown) to provide a relatively even distribution of the wire over the surface of sheet 14, this surface being from 1.5 to 3 square feet in area. The heating wire is of a standard type typically used to wrap or extend in a spiral around pipe exposed to freezing weather to prevent it from freezing. The upper sheet 12 of the Pegboard is mounted over the first one, and the resistance heating wire is held in place by pegs 20, which extend into the perforations in sheets 12 and 14. The pegs are sized to effect a frictional fit between the sheets of Pegboard. The heating wire is a minimum of $\frac{1}{4}$ inch below upper sheet 12.

Sheet 12 functions to provide a generally protective barrier over the heating wire to prevent objects being placed in contact with the heating wire which would impair circulation around the wire. Sheet 12 also assists in maintaining free air movement up through the heater. Thus, in operation, air from along floor 16 goes up through perforations 22 in sheet 14, then is heated as it passes through the region between sheets 12 and 14, after which it passes up through the perforations in sheet 12 to the underside of bed 11. After having been turned on for a period of 24 to 48 hours, bed 11 is generally warmed to 75° F. to 80° F. (in a setting of an ambient temperature in the range of 60° F. to 65° F.). This heating effect permeates the bed, the top side of the mattress and sheet of the bed so that the occupant is typically comfortable without feeling heated.

In one form of the heater, the power input, which is provided through cord 24 and heat sink 25 (which may be a length of heavy, e.g., #14, wire), is fed to a heat controller 26 of the type illustrated in FIG. 2. A switch 30 switches one leg of a 110-volt AC circuit from plug 32 to permit current flow through resistance heating wire 21 and then through one or both of the combination of diode 36 and SCR 37 to the other side of the power line terminating at plug 32. As will be noted, SCR 37 and diode 36 are poled in circuit for conduction in opposite half cycles of input power.

With switch 30 turned on, and SCR 37 not operative, as will be further explained, only diode 36 will conduct, and thus permit power flow through one-half cycle of input power. This thus effects half power operation of heater 21.

Controller 26 provides means of varying the normal portion of half cycle conduction by SCR 37 as a function of temperature and light, largely daylight, present in a room in which the heater is employed. The "turn on" portion of half cycle operation of SCR 37 is controlled by a resistance-capacitance circuit, wherein capacitor 40 is charged at a variable rate as determined by adjustable resistor 42, through which capacitor 40 is charged, and a parallel resistance circuit across capacitor 40 consisting of photoresistive type photocell 44 and thermistor 46, these two elements being connected in series. A capacitor voltage applies a triggering input to SCR 37 through diac 38. Diac 38 is a conventional triggering device which blocks signal flow until an applied voltage reaches a selected level at which point there is conduction.

Photocell 44 and thermistor 46 both have negative resistance characteristics, that is, the resistance of photocell 44 decreases with an increase in light, and the resistance of thermistor 46 decreases with an increase in temperature.

Adjustable resistor 42 is directly in the charging path of capacitor 40, and thus the rise time of voltage across capacitor 40 varies inversely with the resistance setting of adjustable resistor 42. Accordingly, for a given light and temperature condition, if one increases the resistance of resistor 42, the effect will be to reduce the rise time of voltage on capacitor 40 and decrease the "turn on" period of SCR 37 and decrease in power. Photocell 44 and thermistor 46 are connected in parallel with capacitor 40, and they have a reverse effect. Thus, an increase in the sum of their resistances increases the "turn on" time of SCR 37 and increases power, and a decrease in the sum of their resistances decreases the "turn on" time of SCR 37. Accordingly, an increased light or temperature condition will result in a decreased power level, and a decrease in light level or temperature will result in an increase in power level.

The particular role of photocell 44 is to anticipate a lack of needed heat upon the appearance of sunlight to lower the period of conduction of the half cycle during which SCR 37 can be turned on. Its effect on SCR 37 is particualrly significant during relatively mild weather wherein during daylight hours it would be wasteful to provide a high heat level. Thus, during such times, photocell 44 is effective to prevent the "turn on", or reduce the period of "turn on", of SCR 37. Toward evening, and with a reduced light level, and in anticipation of cooler evening conditions, photocell 44 would change to a higher resistance state and would no longer hold down power input to SCR 37 and enable a greater heat output, typically commencing a few hours before bedtime.

If a daytime temperature decreases below a relatively mild state, and thus increased heat is desired during daylight hours, thermistor 46, responsive to the cooler temperature, provides a compensating increase in resistance to that of the decrease (during sunlight) in resistance of photocell 44 to thus maintain a discrete triggering level of voltage for SCR 37 to either fully turn on SCR 37 for its normal half cycle of conduction, or at least turn it on for a selected portion of each half cycle of conduction.

A substantial testing of the heater described herein has indicated that, while it does not provide dramatic increases in bed temperature, such as may be obtained by an electrically powered blanket, it sufficiently removes the chill or coolness from a bed so as to make it quite comfortable for sleeping. Applied heat migrates normally upward through the bed, and then when its flow is interrupted by one's body, there is a particular warming effect, thus contributing to the effectiveness of the heater. The heater has a relatively low level of power consumption, typically in the range of from 75 to 250 watts, and thus is most economical. The heater is basically indestructible in normal use and is a much more durable device than an electrical blanket, which employs rather fragile wires as a heating element medium. Since the introduction of the heater, user acceptance has been excellent; and although there has been no advertising of the heater, except by word of mouth, demand for it has steadily increased.

I claim:

1. A bed heater comprising:
   a first perforated, flat, non-metallic, plate member having a minimum area of 1.5 square feet;
   support legs attached to said first plate and arranged to support said first plate above and parallel to a supporting floor beneath a bed;
   a second perforated, flat, non-metallic, plate member, and means for supporting it parallel to and spaced above said first plate member, and at least a portion of the periphery of the heater between plate members is open;
   an insulated cover type resistance heating fuse wire extending in a series of spaced loops over the surface of said first plate and between said first and second plates;
   power coupling means for coupling power from an A.C. source through said resistance heating fuse wire, and including means inversely proportionally responsive to the intensity of ambient light and temperature for varying power flow to said fuse wire, and comprising:
   an SCR having a control terminal, and power controlled terminals connected in series with said resistance heating fuse wire and poled to pass current in one direction when turned on responsive to a signal applied to its controlled terminal;
   a diode connected across said controlled terminals of said SCR and poled to pass current opposite to said direction; and
   control means for applying a turn-on signal to said control signal of said SCR comprising a resistance-capacitance circuit powered by the A.C. source, and wherein the resistance component of said resistance-capacitance circuit comprises a temperature responsive resistor and a light responsive resistor.

* * * * *